US012785398B2

(12) United States Patent
Park et al.

(10) Patent No.: US 12,785,398 B2
(45) Date of Patent: Nov. 3, 2026

(54) GRID-FORMING INVERTER AND GRID-FORMING INVERTER SYSTEM FOR DISTRIBUTED POWER SOURCES BASED ON INTERMITTENT RENEWABLE ENERGY SOURCES AND CONTROL METHOD THEREOF

(71) Applicant: Korea Institute of Energy Research, Daejeon (KR)

(72) Inventors: Jae Young Park, Daejeon (KR); Sea Seung Oh, Daejeon (KR); Suk In Park, Daejeon (KR); Hye Jin Kim, Sejong-si (KR); Jong Bok Baek, Daejeon (KR)

(73) Assignee: KOREA INSTITUTE OF ENERGY RESEARCH, Daejeon (KR)

(*) Notice: Subject to any disclaimer, the term of this patent is extended or adjusted under 35 U.S.C. 154(b) by 31 days.

(21) Appl. No.: 18/932,185

(22) Filed: Oct. 30, 2024

(65) Prior Publication Data

US 2025/0330022 A1 Oct. 23, 2025

(30) Foreign Application Priority Data

Apr. 17, 2024 (KR) ........................ 10-2024-0051298

(51) Int. Cl.
*H02J 3/1835* (2026.01)
*H02J 3/38* (2026.01)
*H02J 101/24* (2026.01)

(52) U.S. Cl.
CPC .............. *H02J 3/1835* (2013.01); *H02J 3/38* (2013.01); *H02J 2101/25* (2026.01)

(58) Field of Classification Search
CPC ......... H02J 3/1835; H02J 3/38; H02J 2300/26
USPC ............................................................ 307/24
See application file for complete search history.

(56) References Cited

U.S. PATENT DOCUMENTS

2023/0155473 A1 5/2023 Hernandez Manchola et al.
2023/0208140 A1 6/2023 Weiss et al.
2025/0175004 A1 5/2025 Kang et al.

FOREIGN PATENT DOCUMENTS

EP 4 012 918 A1 6/2022
EP 4 044 418 A1 8/2022
JP 2023-533025 A 8/2023
KR 10-2390466 B1 4/2022
(Continued)

OTHER PUBLICATIONS

Translation, International Patent Application Publication WO 2021/256850 A1, downloaded from https://worldwide.espacenet.com (Year: 2026).*
(Continued)

*Primary Examiner* — Hal Kaplan
(74) *Attorney, Agent, or Firm* — Birch, Stewart, Kolasch & Birch, LLP

(57) ABSTRACT

An embodiment of the present disclosure provides a grid-forming inverter comprising: a power stage to convert electric power according to on/off controls of switching devices and to output the converted electric power to a grid; and a control circuit to calculate a frequency command value in proportion to a direct current input voltage and to control the switching devices using pulse width modulation (PWM) according to the frequency command value.

13 Claims, 10 Drawing Sheets

(56) References Cited

FOREIGN PATENT DOCUMENTS

| | | | | | |
|---|---|---|---|---|---|
| KR | 10-2438870 | B1 | | 9/2022 | |
| WO | WO-2021256850 | A1 | * | 12/2021 | .............. H02J 3/381 |

OTHER PUBLICATIONS

Park et al., "Novel Autonomous Control of Grid-Forming DGs to Realize 100% Renewable Energy Grids", IEEE, 2023, pp. 1-14.

* cited by examiner

1140

GRID-FORMING INVERTER AND GRID-FORMING INVERTER SYSTEM FOR DISTRIBUTED POWER SOURCES BASED ON INTERMITTENT RENEWABLE ENERGY SOURCES AND CONTROL METHOD THEREOF

CROSS REFERENCE TO RELATED APPLICATION

This application claims priority to Korea Patent Application No. 10-2024-051298 filed on Apr. 17, 2024, which is hereby incorporated by reference in its entirety.

BACKGROUND

1. Field of Technology

The present disclosure relates to a grid-forming inverter.

2. Related Technology

Inverters to convert electric energy generated by renewable energy sources into electric power having a form suitable for a grid are developed in a form of a grid-following inverter.

A grid-following inverter is controlled to conform with voltages, frequencies, and phases of a grid.

A grid-following inverter has a relatively simple structure, and thus, its installation and operation may be easy. Accordingly, its maintenance costs may be low and its reliability may be high.

Since a grid-following inverter may automatically synchronize with a grid in its voltages, frequencies, and phases, it can easily be connected to the grid and its load on the grid may be minimized.

For a developer who needs to mount an inverter to a renewable energy source, installing a grid-following inverter would be more advantageous either in terms of costs or in terms of operations.

However, in terms of operating a grid, a grid-following inverter has various elements of load.

Traditional synchronous generators have inertia because of their structural characteristics, which is an important element for stability of a grid. The inertia of a synchronous generator comes from its rotating part, in particular, a large turbine and a rotor of the generator. Such inertia helps a grid maintain voltages and frequencies stable within a predetermined range in short-term variability situations generated in a grid, for example, in situations of a sudden increase or decrease of load in a grid.

A grid-following inverter does not provide such inertia to a grid. A grid-following inverter may rather be an element that deteriorates the inertia of a grid due to its characteristic of following voltages and frequencies of a grid. Such a characteristic of a grid-following inverter may be a burden for the management of a grid.

In a case when sufficiently numerous synchronous generators are connected to a grid, there would not be a big problem if multiple grid-following inverters are connected to the grid. However, since the proportion of generation by renewable energy sources increases and the proportion of generation by synchronous generators relatively decreases, the characteristic of grid-following inverters may emerge as a serious problem in terms of management of a grid.

The discussions in this section are only to provide background information and do not constitute an admission of prior art.

SUMMARY

In this background, an aspect of the present disclosure is to provide a technology regarding a grid-forming inverter that contributes to the frequency stability of a grid. Another aspect of the present disclosure is to provide a technology regarding a grid-forming inverter that enables solving the instability in power outputted from intermittent renewable energy sources.

To this end, an embodiment of the present disclosure provides a grid-forming inverter comprising: a power stage to convert electric power according to on/off controls of switching devices and to output the converted electric power to a grid; and a control circuit to calculate a frequency command value in proportion to a direct current input voltage and to control the switching devices using pulse width modulation (PWM) according to the frequency command value.

A capacitor may be disposed in an input side of the power stage and the direct current input voltage may be formed in the capacitor.

The capacitor may be a DC-link capacitor disposed between the input side of the power stage and a source-side converter.

To the source-side converter, a renewable energy source, of which the generation output is changed depending on weather conditions, may be connected.

Between an output side of the power stage and a grid connection point, an output filter having a constant impedance may be disposed.

The control circuit may calculate the frequency command value by multiplying a difference between the direct current input voltage and a reference direct current voltage by a proportional constant and adding a nominal frequency to a result value.

Another embodiment of the present disclosure provides a grid-forming inverter control method, in which a grid-forming inverter controls a power stage to convert electric power according to on/off controls of switching devices and to output the converted electric power to a grid, comprising: calculating a frequency command value in proportion to a direct current input voltage; and controlling the switching devices using pulse width modulation (PWM) according to the frequency command value.

The grid-forming inverter control method may further comprise calculating a voltage command value according to a difference between a value of reactive power of outputted power and a received reactive power command value, and the switching devices may be controlled using PWM according to the frequency command value and the voltage command value in the step of controlling the switching devices using PWM.

Between an input side of the power stage and a source-side converter, a DC-link capacitor may be disposed.

In the step of calculating the frequency command value of the grid-forming inverter control method, the frequency command value may be calculated by multiplying a difference between the direct current input voltage and a reference direct current voltage by a proportional constant and adding a nominal frequency to a result value.

Another embodiment of the present disclosure provides a grid-forming inverter system comprising: a DC-link capacitor; a source-side converter to convert electric power generated by a renewable energy source into a direct current power and to supply it to the DC-link capacitor; and a grid-side converter to calculate a frequency command value in proportion to a voltage of the DC-link capacitor, to convert electric power of the DC-link capacitor according to the frequency command value, and to output it to a grid.

When the voltage of the DC-link capacitor increases, the source-side converter may be controlled to be in a droop mode in which the size of converted power is reduced.

The source-side converter may operate selectively in one of the droop mode and a maximum power point tracking (MPPT) mode.

When a difference between an output command value and a value of power inputted into the grid-side converter is equal to or greater than a predetermined value, the source-side converter may change its mode.

The renewable energy source may be solar panels.

As described above, the present disclosure may provide a technology regarding a grid-forming inverter for contributing to the stabilization of frequencies of a grid. Additionally, the present disclosure may provide a technology regarding a grid-forming inverter for enabling solving instability of output by renewable energy sources.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION OF EMBODIMENTS

Figure 1:
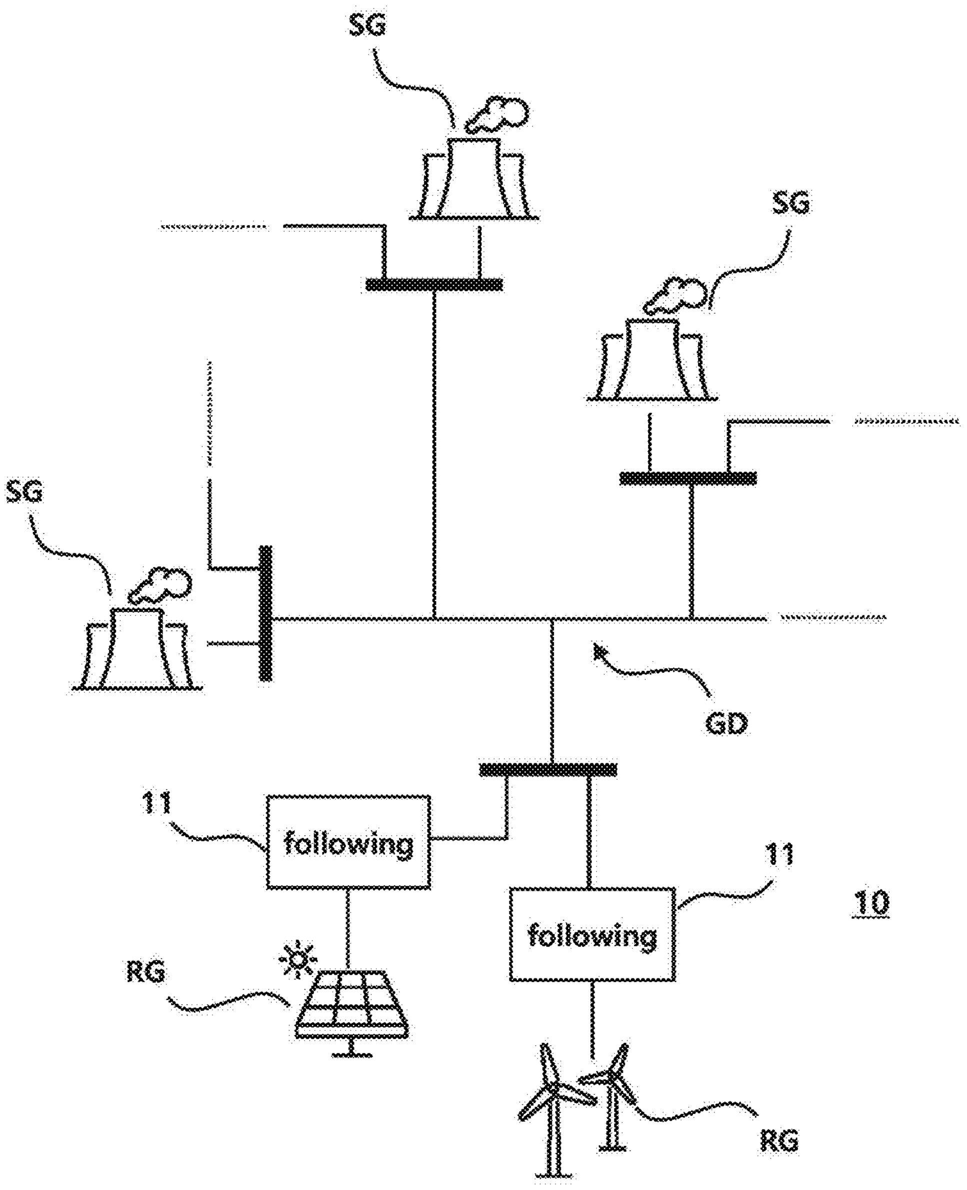
FIG. 1 is a configuration diagram of a general power system.

Hereinafter, some embodiments of the present disclosure will be described in detail with reference to the accompanying drawings. With regard to the reference numerals of the components of the respective drawings, it should be noted that the same reference numerals are assigned to the same components even though they are shown in different drawings. In addition, in describing the present disclosure, a detailed description of a well-known configuration or function related the present disclosure, which may obscure the subject matter of the present disclosure, will be omitted.

In addition, terms, such as "1st", "2nd", "A", "B", "(a)", "(b)", or the like, may be used in describing the components of the present disclosure. These terms are intended only for distinguishing a corresponding component from other components, and the nature, order, or sequence of the corresponding component is not limited to the terms. In the case where a component is described as being "coupled", "combined", or "connected" to another component, it should be understood that the corresponding component may be directly coupled or connected to another component or that the corresponding component may also be "coupled", "combined", or "connected" to the component via another component provided therebetween.

FIG. 1 is a configuration diagram of a general power system.

Referring to FIG. 1, a grid GD may be formed in a power system 10.

The grid GD may be a large-scale electrical grid to which numerous synchronous generators SG are connected. Synchronous generators may include, for example, hydroelectric generators, thermal power generators, nuclear power generators, etc. In a hydroelectric generator, large turbines rotate using water flows of rivers or dams and such rotations of large turbines may generate inertia. A thermal power generator generates electric power by boiling water using combustion by fossil fuels, such as coal, natural gas, or petroleum and rotating turbines using steam generated in this way. In a thermal power generator as well like in a hydroelectric generator, the rotation of turbines may generate inertia. In a nuclear power generator as well, turbines rotate using nuclear power and inertia is generated from this process.

In the general power system 10, the proportion of power generation of synchronous generators SG is overwhelmingly high. Accordingly, the grid GD may stably operate using inertia of the synchronous generators SG.

The general power system 10 may include renewable energy generators (RG) such as photovoltaic power generators and/or wind power generators. Electric power generated by the renewable energy generators RG may not be in a form suitable for the grid GD. For example, electric power generated by a photovoltaic power generator is in a form of direct current voltages, and thus, it cannot be directly inputted into the grid GD, which uses power in a form of alternating current voltages. In case of the wind power generators, since the frequencies or the level of voltages of generated power are different from the frequencies or the voltage level of power used for the grid GD, power generated by the wind power generators cannot be directly inputted into the grid GD.

Accordingly, electric power generated by the renewable energy generators RG may be inputted into the grid GD after it is converted using inverters 11.

The renewable energy generators RG connected to the general power system 10 supply power to the grid GD after converting power mainly using grid-following inverters 11.

The grid-following inverters 11 may be automatically synchronized with the grid GD in terms of voltages, frequencies, and phases, and this leads to an easy connection to the grid GD. The grid-following inverters serve to stably supply to the grid power generated by energy sources having high variability, such as energy sources using photovoltaic power or wind power. Design of a grid-following inverter 11 is relatively simple, and thus, its installation and operation are easy. In addition, this leads to advantages of low maintenance costs and high reliability. In the process of being connected with the grid GD, the grid-following inverter 11 constantly senses states of the grid GD and adjusts output as necessary.

However, in a case when the grid GD is unstable or cannot be used, the grid-following inverters 11 may be stopped operating. This means that, in a situation that the grid GD is stopped operating or malfunctions, the grid-following inverters 11 cannot supply power to the grid GD. The grid-following inverters 11 may have trouble in adapting to the variability of the grid GD and this may affect the stability of the grid GD in combination with a high variability of the renewable energy generators RG.

In response to climate change and in preparation for the exhaustion of fossil fuels, synchronous generators are rapidly replaced with renewable energy generators. When the proportion of synchronous generators SG is reduced and the proportion of renewable energy generators RG increases, sources to supply inertia to the grid GD are also reduced. When the inertia in the grid GD is reduced, the variability in voltages and frequencies increases, even worse, there could be an accident that the grid GD breaks down even by a small change.

In order to deal with the rapid conversion into renewable energy generators RG, researches on using grid-forming inverters instead of grid-following inverters appear.

Figure 2:
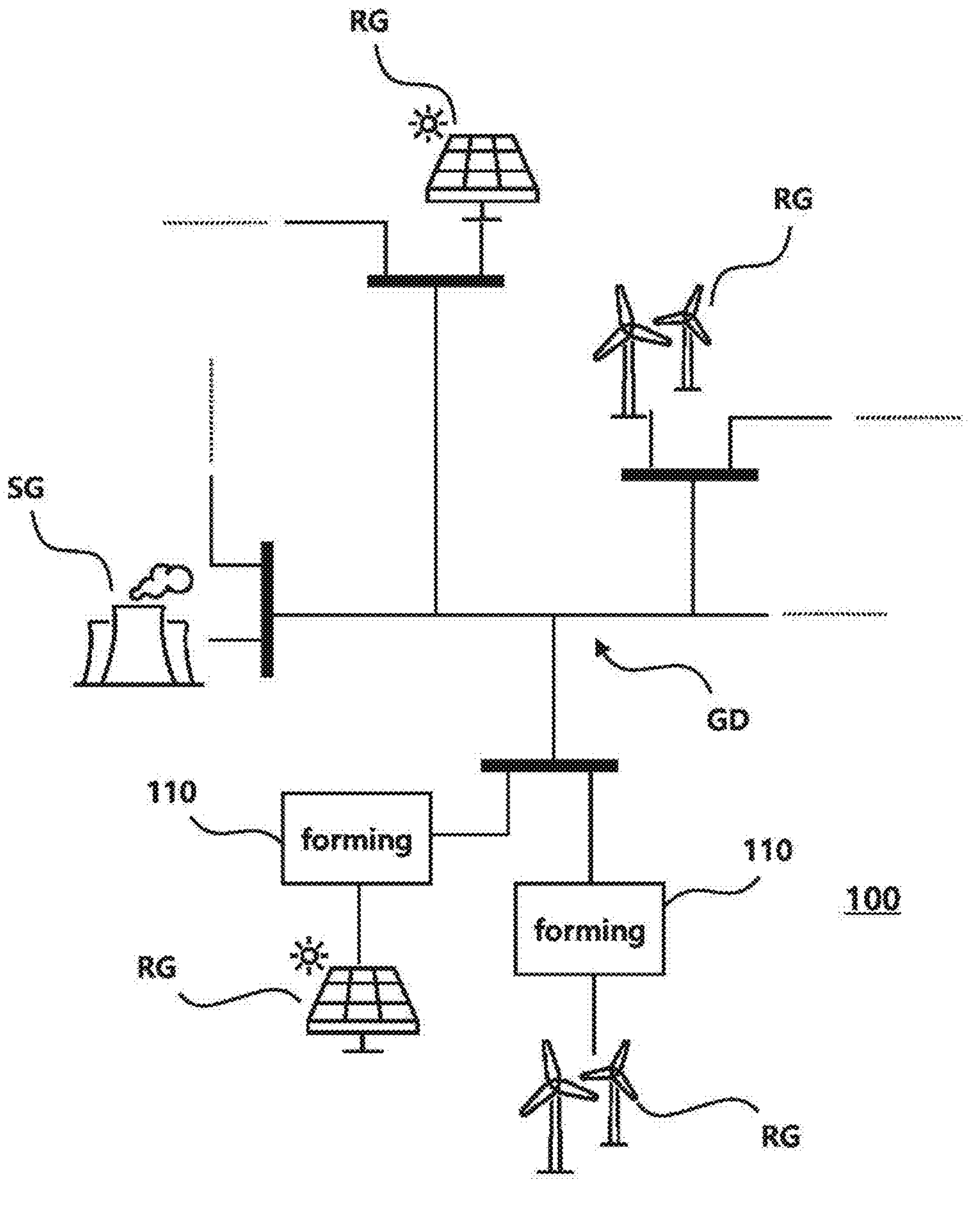
FIG. 2 is a configuration diagram of a power system according to an embodiment.

FIG. 2 is a configuration diagram of a power system according to an embodiment.

Referring to FIG. 2, a grid GD may be formed in a power system 100 and multiple renewable energy generators RG may be connected to the grid GD. Such renewable energy generators RG may supply generated power to the grid GD through grid-forming inverters 110.

The grid-forming inverters 110 may operate as voltage sources. The grid-forming inverters 110 may have ability to set voltages in the grid GD and to maintain them. The grid-forming inverters 110 may generate and adjust voltages by themselves so that they may maintain the voltages and supply power to loads even in a state where they are separated from the grid GD.

Although the grid-forming inverters 110 do not provide physical inertia, it may provide virtual inertia or synthetic inertia to the grid GD. This is a technology of adjusting reactions of an inverter using controlling algorithms so as to make the inverter operate like a synchronous generator having traditional inertia.

A virtual inertia function is designed such that the grid-forming inverters 110 rapidly react to frequency changes of the grid GD. For example, if the frequencies of the grid GD decrease due to sudden increase of loads in the grid GD, the grid-forming inverters 110 may rapidly supply additional power to the grid GD to alleviate the frequency decline. If the loads in the grid GD are reduced on the contrary, the grid-forming inverters 110 may reduce the power supply to inhibit the frequency rise.

The virtual inertia of the grid-forming inverters 110 may serve as an important function in a situation where the proportion of traditional synchronous generators decreases and the proportion of renewable energy generators RG increases in a grid GD. The virtual inertia may assist to maintain stability of a grid GD and to manage changes in frequencies.

Figure 3:
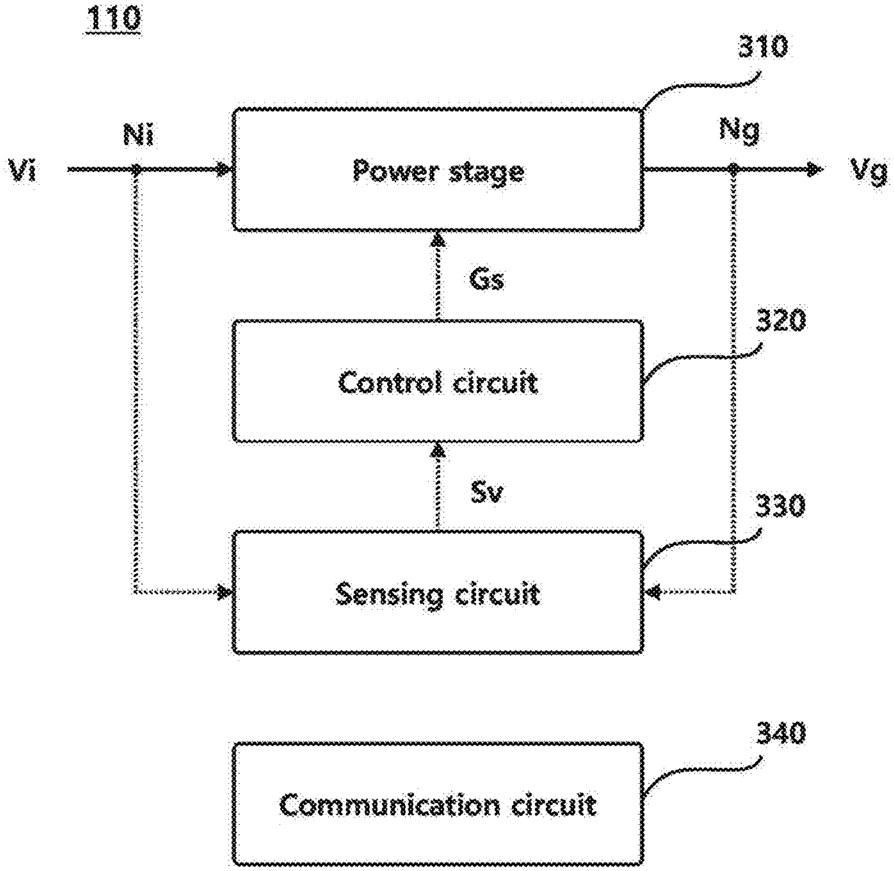
FIG. 3 is a configuration diagram of a grid-forming inverter according to an embodiment.

FIG. 3 is a configuration diagram of a grid-forming inverter according to an embodiment.

Referring to FIG. 3, a grid-forming inverter 110 may comprise a power stage 310, a control circuit 320, a sensing circuit 330, and a communication circuit 340.

The power stage 310 may convert power according to on/off control of switching devices and output converted power to a grid.

To an input node Ni of the power stage 310, direct current input voltages Vi may be supplied. The direct current input voltages Vi may be voltages originating from renewable energy power transferred from renewable energy generators. For example, the direct current input voltages Vi may be voltages originating from power generated by renewable energy generators such as solar panels, wind turbines, or the like.

Renewable energy generators or renewable energy sources may have generation output varying depending on weather conditions. For example, a renewable energy source may be solar panels. In case of solar panels, when the solar irradiance is suddenly changed due to clouds, the generation output may be also suddenly changed.

In the input node Ni, a capacitor may be disposed. The capacitor may be an input capacitor to smooth input electric power or a DC-link capacitor disposed at a direct current (DC) link.

An output node Ng of the power stage 310 may be connected with a grid. Between the output node Ng and a grid connection point, an output filter having constant impedance may be disposed. In a case when power losses due to output filters and/or output lines are negligible, power outputted from the power stage 310 may be practically identical to power supplied to the grid.

The power stage 310 may include multiple switching devices. On or off states of these switching devices may be determined by control signals Gs supplied by the control circuit 320.

The control signals Gs may be gate control signals for the switching devices. The gate control signals may be pulse width modulation (PWM) signals. Each of switching devices may be on in a time period where the PWM signal is at a high level and may be off in a time period where the PWM signal is at a low level.

The control circuit 320 may receive a sensing signal Sv from the sensing circuit 330 and generate a control signal Gs using such a sensing signal Sv. A sensing signal Sv may be a signal of sensing, for example, an input voltage Vi, an output voltage, an input current, an output current, a grid voltage Vg, or the like. An output voltage and a grid voltage Vg may have a same value or different values. The sensing circuit 330 may sense an output voltage and a grid voltage Vg separately; sense an output voltage and estimate a grid voltage Vg; or sense a grid voltage Vg and estimate an output voltage.

The communication circuit 340 may send and receive information with other circuits through analogue communication and/or digital communication. For example, the communication circuit 340 may receive a command value from a superior controller. The communication circuit 340 may receive an active power command value and/or reactive power command value from a superior controller and transmit the command value to the control circuit 320.

Figure 4:
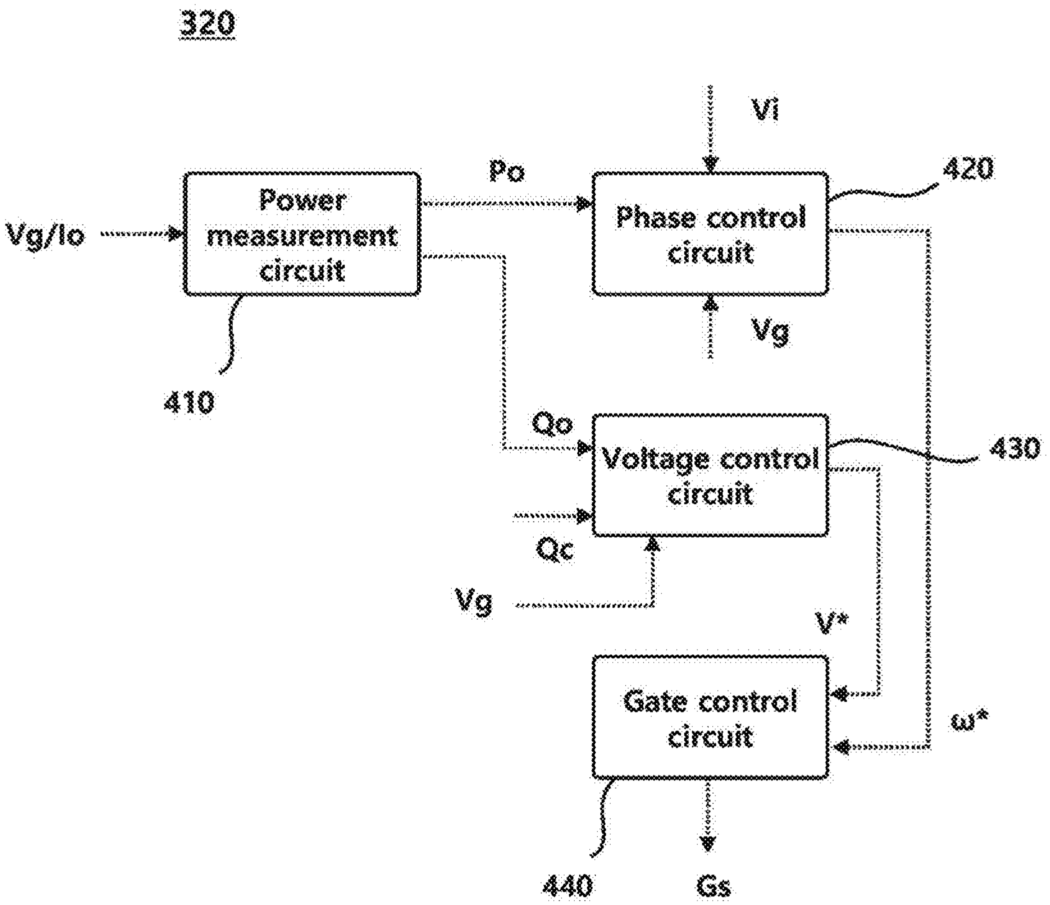
FIG. 4 is a configuration diagram of a control circuit according to an embodiment.

FIG. 4 is a configuration diagram of a control circuit according to an embodiment.

Referring to FIG. 4, the control circuit 320 may comprise a power measurement circuit 410, a phase control circuit 420, a voltage control circuit 430, and a gate control circuit 440.

The power measurement circuit 410 may receive an output voltage or a grid voltage Vg and an output current Io and measure reactive output power Qo and active output power Po. The power measurement circuit 410 is also referred to as a power meter.

The power measurement circuit 410 may also measure input power. The power measurement circuit 410 may receive input voltages, input currents, etc. and measure input power. In a case when a direct current input voltage is supplied to an input side, power may be active power. In addition, in a case when a DC-link capacitor is connected to the input side, the input power may have a size practically identical to the size of power transmitted from the DC-link capacitor. Accordingly, the power measurement circuit 410 may measure power transmitted from the DC-link capacitor to the input side (referred to as 'DC-link capacitor power').

The voltage control circuit 430 may receive a reactive output power Qo and a reactive power command value Qc and to generate a voltage command value V*.

The voltage control circuit 430 may calculate a reactive power reference using a reactive power droop gain formula. The voltage control circuit 430 may form a reactive power droop gain formula using a reactive power droop gain and a value corresponding to an X-intercept or to a Y-intercept and calculate a reactive power reference by substituting an output voltage or a grid voltage Vg into the reactive power droop gain formula. Alternatively, the voltage control circuit 430 may calculate a reactive power reference by adding up a value calculated by the reactive power droop gain formula and a reactive power command value Qc.

The voltage control circuit 430 may calculate a voltage command value V* based on the reactive power reference. The voltage control circuit 430 may calculate a voltage command value V* by applying a proportional integral (PI) control circuit to a difference between the reactive power reference and the reactive output power Qo.

The phase control circuit 420 may calculate a frequency command value ω*. A frequency command value may be in a form of an angular velocity or in a form of a frequency. The form may be selected depending on embodiments.

The frequency command value ω* may be converted into a phase control value θ* to be used. Depending on embodiments, the phase control circuit 420 may calculate a phase control value θ* and output it, or the gate control circuit 440 may calculate a phase control value θ* by receiving a frequency command value ω*.

The phase control circuit 420 may further perform inertia control additionally using an active output power Po and/or a grid voltage Vg, and further perform damping control.

The gate control circuit 440 may generate a control signal Gs to control switching devices using PWM according to a voltage command value V* and a frequency command value ω*.

Meanwhile, the phase control circuit 420 may calculate a frequency command value ω* in proportion to a direct current input voltage. Such control may prevent the collapse of voltages of a DC-link capacitor due to sudden changes in power generated by renewable energy sources in distributed generation sources based on intermittent renewable energy sources.

Figure 5:
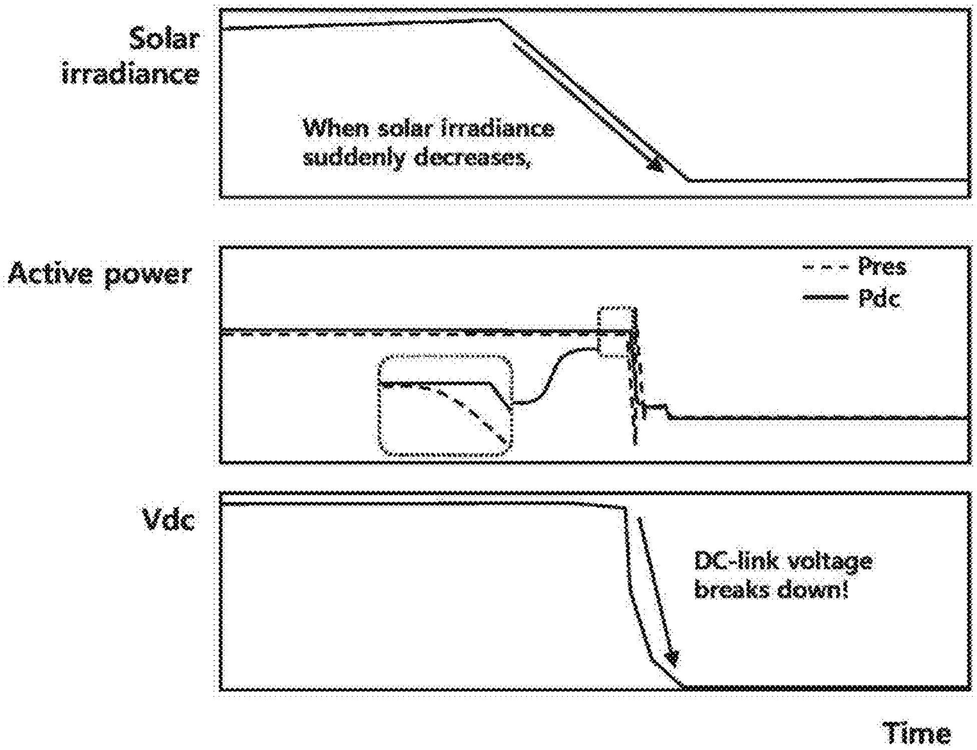
FIG. 5 is a diagram showing voltage collapse of a DC-link capacitor due to a sudden change of power generated by an intermittent renewable energy source.

FIG. 5 is a diagram showing voltage collapse of a DC-link capacitor due to a sudden change of power generated by an intermittent renewable energy source.

Referring to FIG. 5, renewable energy sources may have generation outputs suddenly changed depending on weather conditions.

An upper graph shows solar irradiance over time and a middle graph shows output power Pres of solar panels connected with a DC-link capacitor and power Pdc of the DC-link capacitor transmitted from the DC-link capacitor to a grid in a situation of such solar irradiance. A lower graph shows a collapse of a voltage Vdc of the DC-link capacitor in a situation of such solar irradiance.

In case of the solar panels, the output power Pres may be changed depending on the solar irradiance. In FIG. 5, it can be verified that the output power Pres of the solar panels sharply decreases due to the decrease of the solar irradiance. Even in a case when an inverter outputting power to a grid cannot reflect the sharp decrease of the output power Pres of the solar panels, the power Pdc of the DC-link capacitor may be maintained in a constant value for a certain time as shown in FIG. 5. However, as the power Pdc of the DC-link capacitor becomes different from the output power Pres of the solar panels, the amount of power outputted from the DC-link capacitor becomes more than the amount of power inputted thereto, and this may result in a collapse of the voltage Vdc of the DC-link capacitor.

In order to alleviate such a problem, an embodiment provides control to link the power Pdc of the DC-link capacitor to be transmitted to the grid with the voltage Vdc of the DC-link capacitor.

Figure 6:
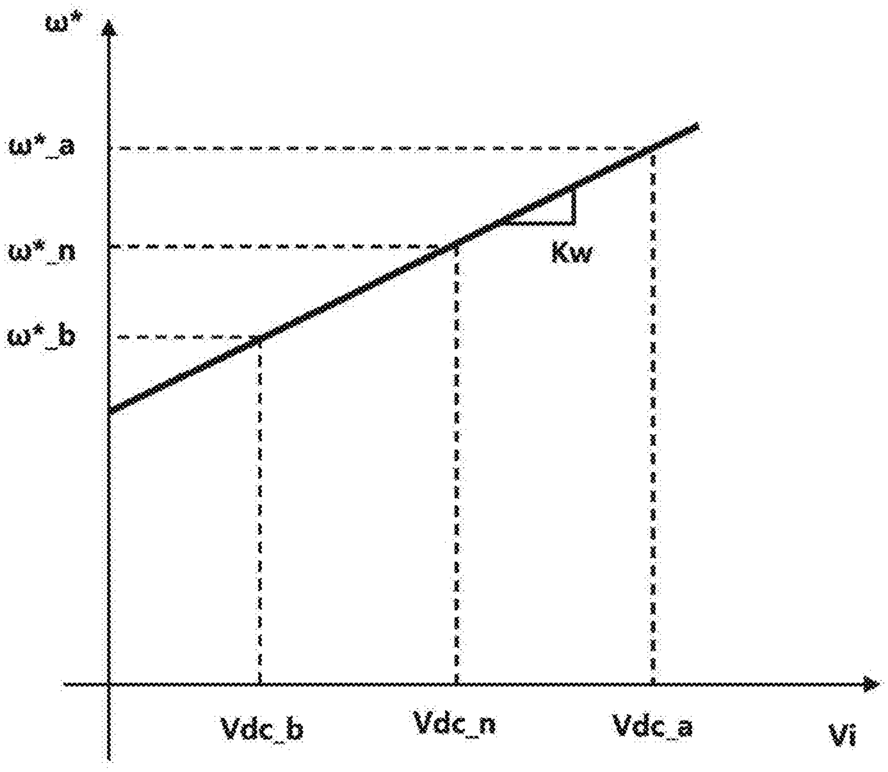
FIG. 6 is a diagram showing a relation between an input voltage and a frequency command value according to an embodiment.

FIG. 6 is a diagram showing a relation between an input voltage and a frequency command value according to an embodiment.

Referring to FIG. 6, the control circuit, in particular, the phase control circuit may calculate a frequency command value ω*.

The phase control circuit may calculate a variance of the frequency command value ω* by multiplying a variance of an input power Vi by a proportional constant Kw.

The phase control circuit may calculate a reference frequency command value ω* n when an input voltage Vi is identical to a reference direct current voltage Vdc_n. Additionally, the phase control circuit may calculate a first frequency command value ω*_a with a frequency command value ω* when the input voltage Vi increases to be a first direct current voltage Vdc_a. Further, the phase control circuit may calculate a second frequency command value ω*_b with the frequency command value ω* when the input voltage Vi decreases to be a second direct current voltage Vdc_b.

If this is represented with the proportional constant Kw, a relation formula 'ω*_a−ω*_n=Kw(Vdc_a−Vdc_n)' and a relation formula 'ω*_b−ω*_n=Kw(Vdc_b−Vdc_n)' may be established.

Figure 7:
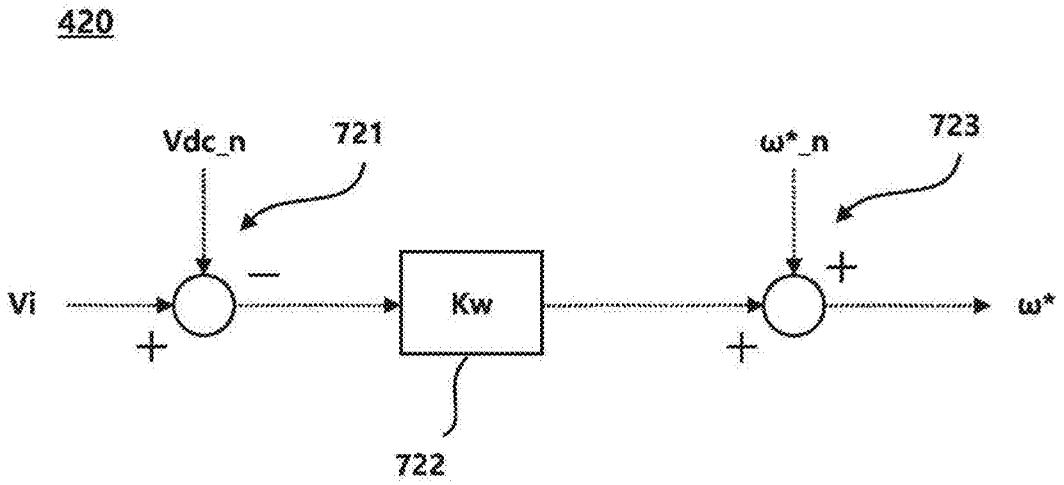
FIG. 7 is a configuration diagram of a phase control circuit according to an embodiment.

FIG. 7 is a configuration diagram of a phase control circuit according to an embodiment.

Referring to FIG. 7, the phase control circuit 420 may comprise an input voltage variance calculation circuit 721, an amplification circuit 722, and an offset circuit 723.

The input voltage variance calculation circuit 721 may calculate a difference between the input voltage Vi and the reference direct current voltage Vdc_n. The amplification circuit 722 may multiply the difference by the proportional constant Kw.

The offset circuit 723 may calculate the frequency command value ω* by adding a nominal frequency ω*_n to a calculated result value from the amplification circuit 722.

Figure 8:
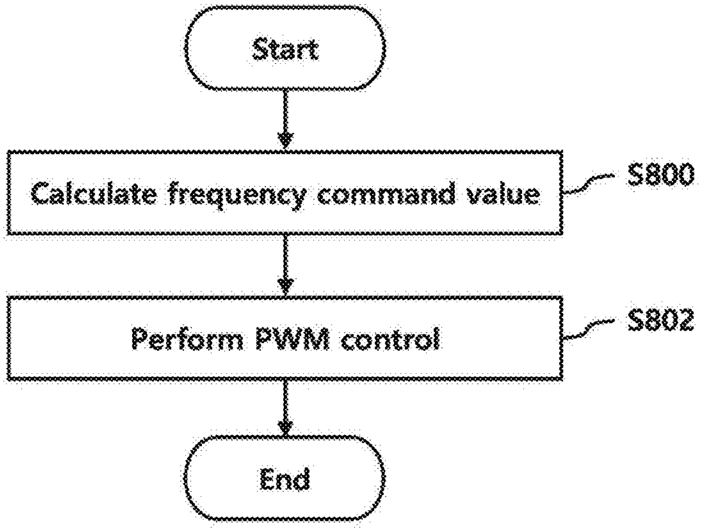
FIG. 8 is a flow diagram of a grid-forming inverter control method according to an embodiment.

FIG. 8 is a flow diagram of a grid-forming inverter control method according to an embodiment.

Referring to FIG. 8, a grid-forming inverter may calculate a frequency command value in proportion to a direct current input voltage (S800). Here, the grid-forming inverter may calculate the frequency command value by multiplying a difference between a direct current input voltage and a reference direct current voltage by a proportional constant and adding a nominal frequency to a result value.

Subsequently, the grid-forming inverter may control switching devices using pulse width modulation (PWM) based on the calculated frequency command value (S802).

By such a control method, the grid-forming inverter may control a power stage to convert power according to on/off controls of the switching devices and to output the converted power to a grid.

The grid-forming inverter control method may further include a step (not shown), in which the grid-forming inverter calculates a voltage command value based on a difference between a value of reactive power of outputted power and a received reactive power command value. The grid-forming inverter may control switching devices of the power stage using PWM according to the voltage command value and the frequency command value calculated as such.

Between an input side of the power stage and a source-side converter, a DC-link capacitor may be disposed.

Figure 9:
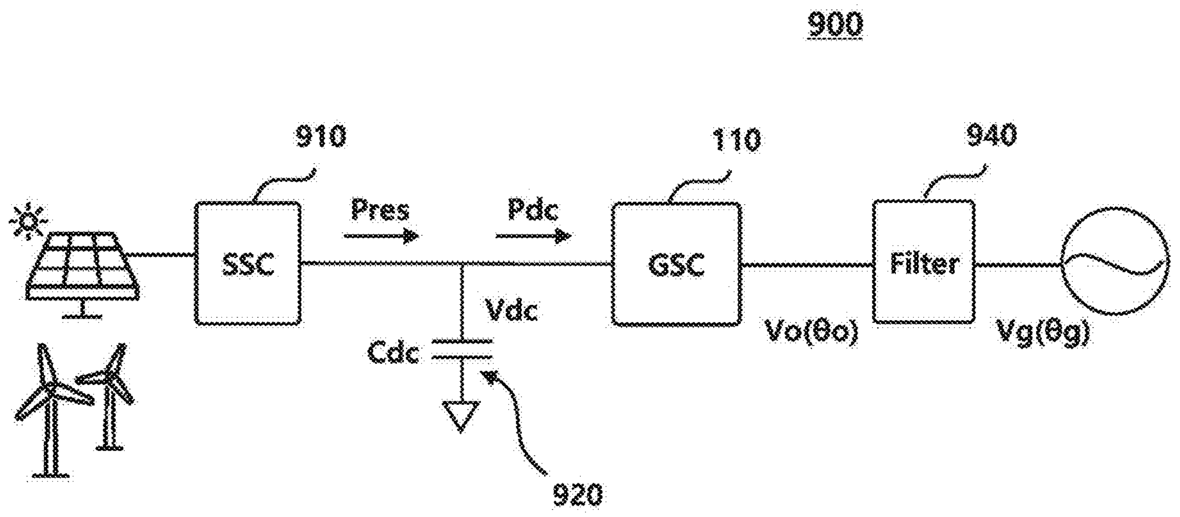
FIG. 9 is a configuration diagram of a grid-forming inverter system according to an embodiment.

FIG. 9 is a configuration diagram of a grid-forming inverter system according to an embodiment.

Referring to FIG. 9, a grid-forming inverter system 900 (referred to as 'system', hereinafter) may comprise a source-side converter 910, a DC-link capacitor 920, a grid-side converter 110, and an output filter 940.

The source-side converter 910 may convert power generated by renewable energy sources into direct current power and supply it to the DC-link capacitor 920.

The grid-side converter 110 may be a grid-forming inverter describe above. The grid-side converter 110 may calculate a frequency command value in proportion to a voltage of the DC-link capacitor 920 and convert power of the DC-link capacitor 920 according to the frequency command value to output the power to a grid.

The output filter 940 may be disposed between the grid-side converter 110 and the grid.

$$\frac{1}{2}C_{DC}\frac{d}{dt}V_{DC}^2 = P_{RES} - P_{DC} \quad \text{[Formula 1]}$$

A relation equation between a voltage Vdc formed in the DC-link capacitor 920, a capacitor capacity Cdc, power Pres outputted from the source-side converter 910, and power Pdc of the DC-link capacitor may be as Formula 1.

$$Pdc \fallingdotseq (Vo)(Vg)\sin(\theta o - \theta g)/(Xl) \fallingdotseq (Vo)(Vg)(\theta o - \theta g)/(Xl) \quad \text{[Formula 2]}$$

When ignoring power losses in the output filter 940 and switching losses in the grid-side converter 110, a relation between power Pdc of the DC-link capacitor, a voltage Vo and a phase θo of output power from the grid-side converter 110, and a voltage Vg and a phase θg of a grid connection point may be as Formula 2.

The grid-side converter 110 may calculate a frequency command value in proportion to an input voltage (here, a voltage Vdc of the DC-link capacitor) as described above according to the relations in Formula 1 and Formula 2.

Meanwhile, the source-side converter 910 may perform control to rapidly stabilize the voltage Vdc of the DC-link capacitor in cooperation with the grid-side converter 110.

The source-side converter 910 may perform control in a droop mode where the source-side converter 910 reduces the size of the converted power Pres when the voltage Vdc of the DC-link capacitor increases and it increases the size of the converted power Pres when the voltage Vdc of the DC-link capacitor decreases. In this way, the source-side converter 910 may contribute to stabilization of the voltage Vdc of the DC-link capacitor.

The source-side converter 910 may be controlled to be in the droop mode when the weather conditions are good and it may be controlled to be in a maximum power point tracking (MPPT) mode when the weather conditions are deteriorated.

Figure 10:
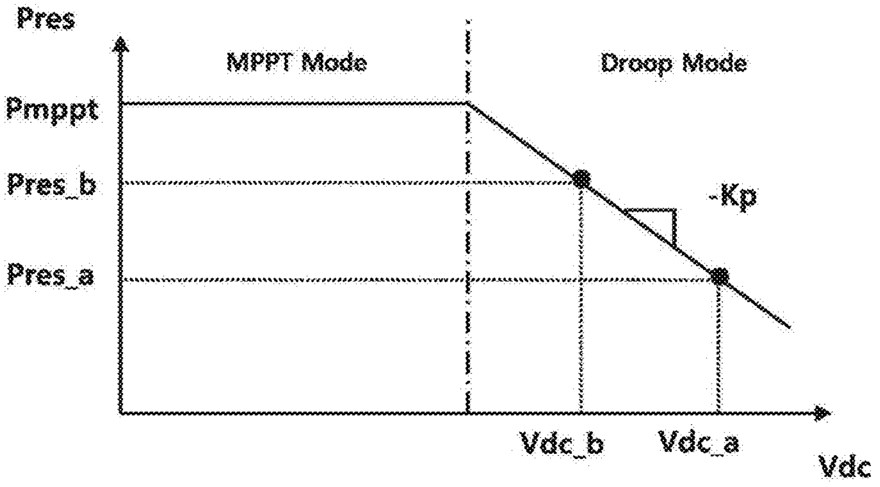
FIG. 10 is a diagram showing a control mode of a source-side converter according to an embodiment.

FIG. 10 is a diagram showing a control mode of a source-side converter according to an embodiment.

Referring to FIG. 10, the source-side converter may be controlled to be in the MPPT mode when the voltage Vdc of the DC-link capacitor is equal to or less than a predetermined value. Here, the source-side converter may be controlled to be able to output maximum power Pmppt.

When the voltage Vdc of the DC-link capacitor exceeds a predetermined value, the source-side converter may be controlled to be in the droop mode.

In the droop mode, the source-side converter may calculate an output command value P*res based on a droop curve. For example, in a case when the Vdc is a first direct current voltage Vdc_a, the source-side converter may determine a first output power Pres_a corresponding to the first direct current voltage Vdc_a on the droop curve as an output command value, and in a case when the Vdc is a second direct current voltage Vdc_b, the source-side converter may determine a second output power Pres_b on the droop curve as an output command value.

The source-side converter may calculate a variance of output power Pres by multiplying a variance of the Vdc by a negative constant −Kp.

If representing this in a formula, this can be 'P*res=Kp (Vdc_n−Vdc)+Pset'. Here, Vdc_n is a reference voltage, Pset is an offset, and Kp is a proportional constant.

Figure 11:
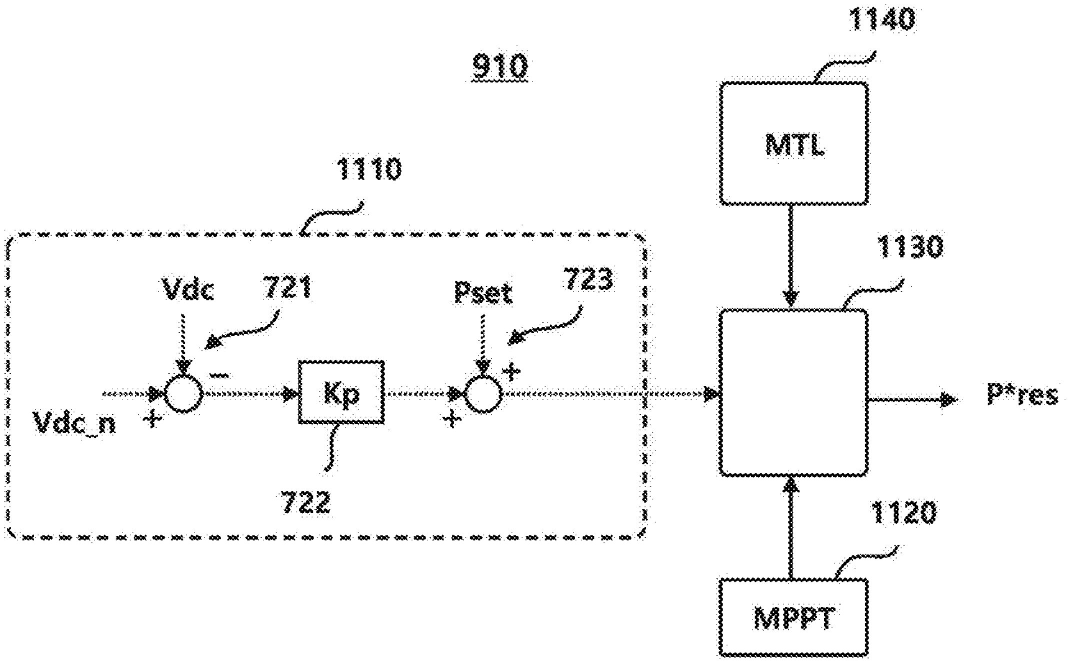
FIG. 11 is a diagram showing components for control of a source-side converter according to an embodiment.

FIG. 11 is a diagram showing components for control of a source-side converter according to an embodiment.

Referring to FIG. 11, a source-side converter 910 may comprise a droop mode control circuit 1110, an MPPT control circuit 1120, a mode selection circuit 1130, and a selection signal circuit 1140.

The droop mode control circuit 1110 may calculate an output command value by comparing a voltage of the DC-link capacitor with a reference voltage, multiplying a difference between them by a proportional constant Kp, and adding an offset Pset to the result. The MPPT control circuit 1120 may calculate an output command value according to an MPPT control algorithm.

Two different output command values may be transmitted to the mode selection circuit 1130 and the mode selection circuit 1130 may select one of the two output command values and output the selected one as a final output command value P*res.

Figure 12:
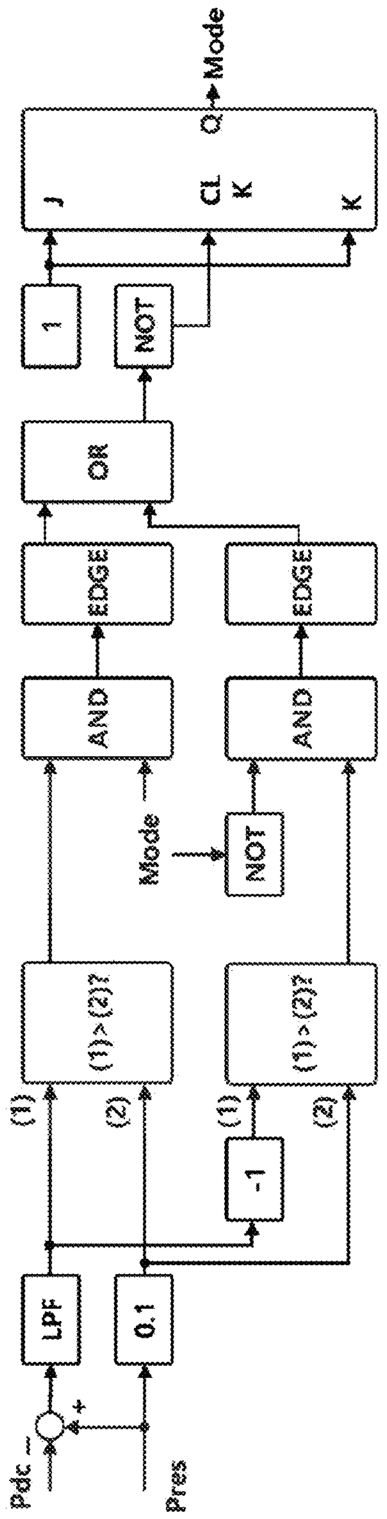
FIG. 12 is a configuration diagram of a selection signal circuit of a source-side converter.

FIG. 12 is a configuration diagram of a selection signal circuit of a source-side converter.

Referring to FIG. 12, the selection signal circuit 1140 may receive power Pdc of the DC-link capacitor and the output command value P*res of the source-side converter as input values and determine a mode value using these input values.

In an example of FIG. 12, the mode value may be set to be 1 as an initial value and 1 may indicate the droop mode.

In a case when power actually outputted from the source-side converter is insufficient in comparison with the output command value P*res (in a case when a difference between the P*res and the Pdc is less than 10% of the P*res in the example of FIG. 12), the selection signal circuit 1140 may consider it that the weather condition is poor and convert a control mode to be the MPPT mode (Mode=0).

For the difference between the P*res and the Pdc, a measurement value may not directly used, but a value obtained by applying a low pass filter may be used in order to remove effects of noise.

In a case when the weather condition becomes good and the Pdc exceeds the P*res (in a case when the difference between the P*res and the Pdc is greater than 10% of the P*res in the example of FIG. 12), the selection signal circuit 1140 may consider it that the weather condition is good and convert the control mode to be the droop mode (Mode=1).

As described above, the present disclosure may provide a technology regarding a grid-forming inverter for contributing to stabilization of frequencies of a grid. In addition, the present disclosure may provide a technology regarding a grid-forming inverter for resolving instability in power outputted from intermittent renewable energy sources.

Since terms, such as "including," "comprising," and "having" mean that corresponding elements may exist unless they are specifically described to the contrary, it shall be construed that other elements can be additionally included, rather than that such elements are excluded. All technical, scientific, or other terms are used consistently with the meanings as understood by a person skilled in the art unless defined to the contrary. Common terms as found in dictionaries should be interpreted in the context of the related technical writings, rather than overly ideally or impractically, unless the present disclosure expressly defines them so.

Although a preferred embodiment of the present disclosure has been described for illustrative purposes, those skilled in the art will appreciate that various modifications, additions, and substitutions are possible without departing from the scope and spirit of the embodiment as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A grid-forming inverter comprising:
- a power stage configured to convert electric power according to on/off controls of switching devices and output the converted electric power to a grid; and
- a control circuit configured to calculate a frequency command value in proportion to a direct current input voltage and control the switching devices using pulse width modulation (PWM) according to the frequency command value,
- wherein the control circuit calculates the frequency command value by multiplying a difference between the direct current input voltage and a reference direct current voltage by a proportional constant and adding a nominal frequency to a result value.

2. The grid-forming inverter of claim 1, wherein a capacitor is disposed in an input side of the power stage, and
- wherein the direct current input voltage is formed in the capacitor.

3. The grid-forming inverter of claim 2, wherein the capacitor is a DC-link capacitor disposed between the input side of the power stage and a source-side converter.

4. The grid-forming inverter of claim 3, wherein, to the source-side converter, a renewable energy source, in which generation output is changed depending on weather conditions, is connected.

5. The grid-forming inverter of claim 1, wherein, between an output side of the power stage and a grid connection point, an output filter having a constant impedance is disposed.

6. A grid-forming inverter control method, in which a grid-forming inverter controls a power stage to convert electric power according to on/off controls of switching devices and to output the converted electric power to a grid, the grid-forming inverter method comprising:
- calculating a frequency command value in proportion to a direct current input voltage; and
- controlling the switching devices using pulse width modulation (PWM) according to the frequency command value,
- wherein, in the calculating the frequency command value, the frequency command value is calculated by multiplying a difference between the direct current input voltage and a reference direct current voltage by a proportional constant and adding a nominal frequency to a result value.

7. The grid-forming inverter control method of claim 6, further comprising:
- calculating a voltage command value according to a difference between a value of reactive power of outputted power and a received reactive power command value,
- wherein the switching devices are controlled using the PWM according to the frequency command value and the voltage command value in the controlling the switching devices using the PWM.

8. The grid-forming inverter control method of claim 6, wherein, between an input side of the power stage and a source-side converter, a DC-link capacitor is disposed.

9. A grid-forming inverter system comprising:
- a DC-link capacitor;
- a source-side converter to convert electric power generated by a renewable energy source into a direct current power and to supply the direct current power to the DC-link capacitor; and
- a grid-side converter to calculate a frequency command value in proportion to a voltage of the DC-link capacitor, to convert electric power of the DC-link capacitor according to the frequency command value, and to output the electric power to a grid.

10. The grid-forming inverter system of claim 9, wherein, when the voltage of the DC-link capacitor increases, the source-side converter is controlled to be in a droop mode in which the amount of converted power is reduced.

11. The grid-forming inverter system of claim 10, wherein the source-side converter operates selectively in one of the droop mode and a maximum power point tracking (MPPT) mode.

12. The grid-forming inverter system of claim 11, wherein, when a difference between an output command value and a value of power inputted into the grid-side converter is equal to or greater than a predetermined value, the source-side converter changes its mode.

13. The grid-forming inverter system of claim 9, wherein the renewable energy source is solar panels.

* * * * *